United States Patent
Kupherstein et al.

(10) Patent No.: US 7,698,734 B2
(45) Date of Patent: Apr. 13, 2010

(54) SINGLE SIGN-ON (SSO) FOR NON-SSO-COMPLIANT APPLICATIONS

(75) Inventors: Yakov Kupherstein, Shimshon (IL); Dror Yaffe, Gan Yavne (IL)

(73) Assignee: International Business Machines Corporation, Armonk, NY (US)

( * ) Notice: Subject to any disclaimer, the term of this patent is extended or adjusted under 35 U.S.C. 154(b) by 1445 days.

(21) Appl. No.: 10/923,923

(22) Filed: Aug. 23, 2004

(65) Prior Publication Data

US 2006/0041933 A1 Feb. 23, 2006

(51) Int. Cl.
G06F 7/04 (2006.01)
G06F 15/16 (2006.01)
G06F 17/30 (2006.01)
H04L 29/06 (2006.01)

(52) U.S. Cl. .................. 726/8; 726/7; 726/9; 726/10
(58) Field of Classification Search .................. 726/8, 726/7, 9, 10
See application file for complete search history.

(56) References Cited

U.S. PATENT DOCUMENTS

| | | | |
|---|---|---|---|
| 5,944,824 A * | 8/1999 | He ................................. | 726/6 |
| 6,178,511 B1 * | 1/2001 | Cohen et al. ................... | 726/6 |
| 6,327,659 B2 * | 12/2001 | Boroditsky et al. ......... | 713/182 |
| 6,332,192 B1 * | 12/2001 | Boroditsky et al. ......... | 713/168 |
| 6,691,232 B1 * | 2/2004 | Wood et al. .................... | 726/6 |
| 6,732,105 B1 * | 5/2004 | Watson et al. ................. | 707/10 |
| 6,826,692 B1 * | 11/2004 | White ........................... | 726/8 |
| 6,938,158 B2 * | 8/2005 | Azuma ....................... | 713/182 |
| 6,973,617 B1 * | 12/2005 | Parasu ......................... | 715/513 |
| 7,069,440 B2 * | 6/2006 | Aull ............................ | 713/175 |
| 7,085,840 B2 * | 8/2006 | de Jong et al. .............. | 709/229 |
| 7,164,685 B2 * | 1/2007 | Atamaniouk ................. | 370/401 |
| 7,221,935 B2 * | 5/2007 | Barriga-Caceres et al. ....................... | 455/414.1 |
| 7,237,256 B2 * | 6/2007 | Cheng et al. ................... | 726/3 |
| 7,246,230 B2 * | 7/2007 | Stanko ....................... | 713/155 |
| 7,249,375 B2 * | 7/2007 | Bhatia et al. ................... | 726/8 |
| 7,275,259 B2 * | 9/2007 | Jamieson et al. ............... | 726/8 |
| 7,275,260 B2 * | 9/2007 | de Jong et al. ................ | 726/10 |
| 7,296,290 B2 * | 11/2007 | Barriga et al. .................. | 726/8 |
| 7,475,146 B2 * | 1/2009 | Bazot et al. .................. | 709/227 |
| 2002/0176582 A1 * | 11/2002 | Aull ........................... | 380/279 |
| 2003/0012382 A1 * | 1/2003 | Ferchichi et al. ............ | 380/270 |
| 2003/0126136 A1 * | 7/2003 | Omoigui ...................... | 707/10 |
| 2003/0177356 A1 * | 9/2003 | Abela ........................ | 713/168 |
| 2003/0229783 A1 * | 12/2003 | Hardt ........................ | 713/155 |
| 2004/0025056 A1 * | 2/2004 | Katsube ..................... | 713/201 |
| 2004/0078312 A1 * | 4/2004 | Bush et al. .................... | 705/35 |
| 2004/0117493 A1 * | 6/2004 | Bazot et al. ................. | 709/229 |
| 2004/0123144 A1 * | 6/2004 | Chan et al. .................. | 713/201 |
| 2004/0153908 A1 * | 8/2004 | Schiavone et al. .......... | 714/712 |
| 2004/0181469 A1 * | 9/2004 | Saeki .......................... | 705/30 |
| 2004/0249961 A1 * | 12/2004 | Katsube et al. ............. | 709/229 |

(Continued)

*Primary Examiner*—David García Cervetti
(74) *Attorney, Agent, or Firm*—Daniel McLoughlin; Hoffman Warnick LLC

(57) ABSTRACT

A method for providing SSO authentication when accessing non-SSO-compliant applications, the method including forwarding a user name and a password received from a non-SSO-compliant application to an SSO proxy, encapsulating the user name and password in a request to access a protected application, authenticating the user name and password responsive to the request using SSO authentication, and generating an SSO token if said authentication step is successful.

38 Claims, 4 Drawing Sheets

U.S. PATENT DOCUMENTS

| | | | |
|---|---|---|---|
| 2004/0250118 A1* | 12/2004 | Andreev et al. | 713/201 |
| 2005/0015490 A1* | 1/2005 | Saare et al. | 709/225 |
| 2005/0039008 A1* | 2/2005 | Bhatia et al. | 713/170 |
| 2005/0039054 A1* | 2/2005 | Satoh et al. | 713/201 |
| 2005/0108575 A1* | 5/2005 | Yung | 713/201 |
| 2005/0188212 A1* | 8/2005 | Laferriere et al. | 713/185 |
| 2005/0283443 A1* | 12/2005 | Hardt | 705/67 |
| 2005/0283614 A1* | 12/2005 | Hardt | 713/182 |
| 2006/0013393 A1* | 1/2006 | Ferchichi et al. | 380/247 |
| 2006/0020791 A1* | 1/2006 | Laitinen | 713/168 |
| 2006/0195893 A1* | 8/2006 | Caceres et al. | 726/8 |
| 2006/0200671 A1* | 9/2006 | Ishigaki et al. | 713/176 |
| 2007/0208936 A1* | 9/2007 | Ramos Robles | 713/168 |

* cited by examiner

SINGLE SIGN-ON (SSO) FOR NON-SSO-COMPLIANT APPLICATIONS

FIELD OF THE INVENTION

The present invention relates to client-server technology in general, and in particular to integrating non-SSO-compliant applications into an SSO system.

BACKGROUND OF THE INVENTION

Network-based applications often make use of many different technologies, object models, and programming languages, from simple Perl scripts and standalone applications implemented in C++ or Java™, to sophisticated applications running on J2EE application servers. In the past, access security was the responsibility of each application, requiring users to employ different user names and passwords for different applications. As users required access to increasing numbers of applications of all types, single sign-on (SSO) mechanisms were developed to standardize access security protocols and form application domains whereby users are given access to applications within the domain without having to separately sign on to each application. To accomplish this, all security algorithms are typically found in a single SSO server which acts as the only authentication point for a defined domain. Thus, a user signs on and is authenticated only once, and thereafter may securely interact with many different elements within a given domain. This is typically done by generating an SSO token for the user after the user is first authenticated, providing the token to the user, and thereafter having the user pass the token to other SSO applications which validate the token with the SSO server.

Unfortunately, not all applications are SSO-compliant. To remedy this, non-SSO-compliant applications may be modified internally to implement SSO mechanisms. However, such applications would need to be modified each time there is a change to the SSO protocol at the SSO server level. Enabling non-SSO-compliant applications to work within an SSO framework without requiring that the applications be modified internally to implement SSO mechanisms would therefore be advantageous.

SUMMARY OF THE INVENTION

The present invention discloses a system and method for integrating non-SSO-compliant applications into an SSO system.

In one aspect of the present invention a method is provided for providing SSO authentication when accessing non-SSO-compliant applications, the method including forwarding a user name and a password received from a non-SSO-compliant application to an SSO proxy, encapsulating the user name and password in a request to access a protected application, authenticating the user name and password responsive to the request using SSO authentication, and generating an SSO token if the authentication step is successful.

In another aspect of the present invention the method further includes providing the SSO token, the user name, and a notification of the successful authentication to a server.

In another aspect of the present invention the method further includes providing the SSO token and the user name to the protected application.

In another aspect of the present invention the method further includes providing the token and a notification of the successful authentication to the SSO proxy.

In another aspect of the present invention the method further includes configuring the SSO proxy as an HTTP client.

In another aspect of the present invention the method further includes configuring the encapsulated request as an HTTP request.

In another aspect of the present invention the method further includes sending the request to a J2EE server.

In another aspect of the present invention the method further includes configuring the protected application as a protected HTTP servlet residing on a J2EE server.

In another aspect of the present invention a system is provided for SSO authentication for use with non-SSO-compliant applications, the system including an SSO proxy operative to receive a user name and password from a non-SSO-compliant application and encapsulate the user name and password in a request to access a protected application, and an authenticator operative to authenticate the user name and password responsive to the request using SSO authentication and generate an SSO token if the authentication is successful.

In another aspect of the present invention the authenticator is operative to provide the SSO token, the user name, and a notification of the successful authentication to a server.

In another aspect of the present invention the server is operative to provide the SSO token and the user name to the protected application.

In another aspect of the present invention the protected application is operative to provide the token and a notification of the successful authentication to the SSO proxy.

In another aspect of the present invention the SSO proxy is an HTTP client.

In another aspect of the present invention the encapsulated request is an HTTP request.

In another aspect of the present invention the server is a J2EE server.

In another aspect of the present invention the protected application is a protected HTTP servlet residing on a J2EE server.

In another aspect of the present invention a method is provided for providing SSO authentication when accessing non-SSO-compliant applications, the method including forwarding a user name and token received from a non-SSO-compliant application to an SSO proxy, encapsulating the user name and token in a request to access a protected application, authenticating the token responsive to the request using SSO authentication, and generating a security context for the request if the authentication step is successful.

In another aspect of the present invention the generating step includes generating the security context to include the authenticated token and the user name.

In another aspect of the present invention the method further includes passing the request, the user name, and a notification of the successful authentication to a server.

In another aspect of the present invention the method further includes passing the request, the user name, and a notification of the successful authentication to the protected application.

In another aspect of the present invention the method further includes comparing the user name received with the request with the user name received with the security context of the request, and providing an affirmative response to the request if the user names match.

In another aspect of the present invention the providing step includes providing the affirmative response to the SSO proxy.

In another aspect of the present invention the method further includes configuring the SSO proxy as an HTTP client.

In another aspect of the present invention the method further includes configuring the encapsulated request as an HTTP request.

In another aspect of the present invention the method further includes sending the request to a J2EE server.

In another aspect of the present invention the method further includes configuring the protected application as a protected HTTP servlet residing on a J2EE server.

In another aspect of the present invention a system is provided for SSO authentication for use with non-SSO-compliant applications, the system including an SSO proxy operative to receive a user name and token from a non-SSO-compliant application and encapsulate the user name and token in a request to access a protected application, and an authenticator operative to authenticate the user name and token responsive to the request using SSO authentication and generate a security context for the request if the authentication step is successful.

In another aspect of the present invention the security context includes the authenticated token and the user name.

In another aspect of the present invention the authenticator is operative to pass the request, the user name, and a notification of the successful authentication to a server.

In another aspect of the present invention the server is operative to pass the request, the user name, and a notification of the successful authentication to the protected application.

In another aspect of the present invention the protected application is operative to compare the user name received with the request with the user name received with the security context of the request, and provide an affirmative response to the request if the user names match.

In another aspect of the present invention the protected application is operative to provide the affirmative response to the SSO proxy.

In another aspect of the present invention the SSO proxy is an HTTP client.

In another aspect of the present invention the encapsulated request is an HTTP request.

In another aspect of the present invention the server is a J2EE server.

In another aspect of the present invention the protected application is a protected HTTP servlet residing on a J2EE server.

In another aspect of the present invention a method is provided for implementing SSO authentication in support of non-SSO-compliant application access, the method including providing a SSO proxy operative to receive a user name and a password from a non-SSO-compliant application, and configuring the SSO proxy to a) encapsulate the user name and password in a request to access a protected application, and b) send the request to a computer operative to c) authenticate the user name and password responsive to the request using SSO authentication, and d) generate an SSO token if the authentication is successful.

In another aspect of the present invention a computer program is provided embodied on a computer-readable medium, the computer program including a first code segment operative to forward a user name and a password received from a non-SSO-compliant application to an SSO proxy, a second code segment operative to encapsulate the user name and password in a request to access a protected application, a third code segment operative to authenticate the user name and password responsive to the request using SSO authentication, and a fourth code segment operative to generate an SSO token if the authentication is successful.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
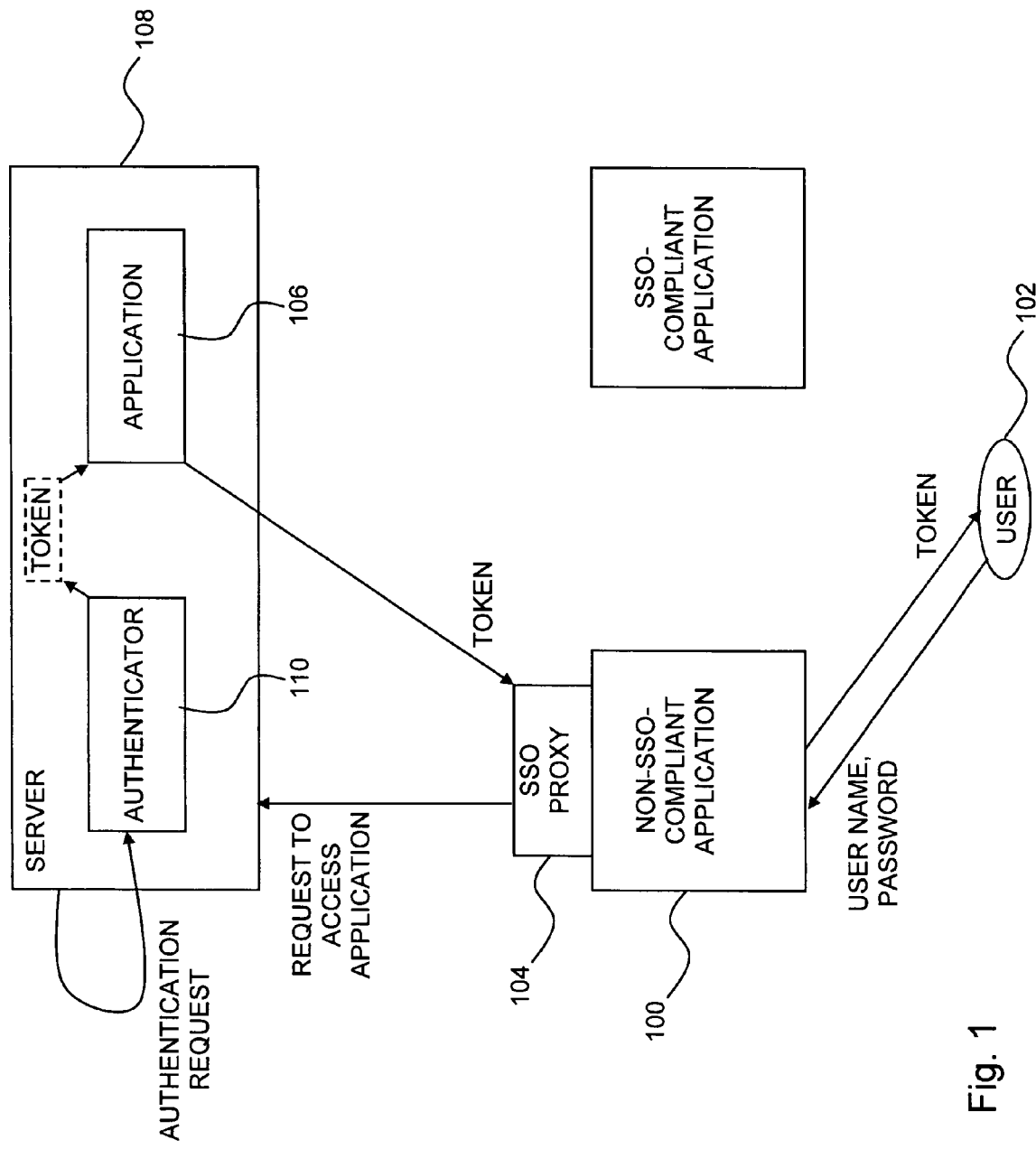
FIG. 1 is a simplified block-flow diagram of an SSO system supporting authentication by password for non-SSO-compliant applications, constructed and operative in accordance with a preferred embodiment of the present invention.
Figure 2:
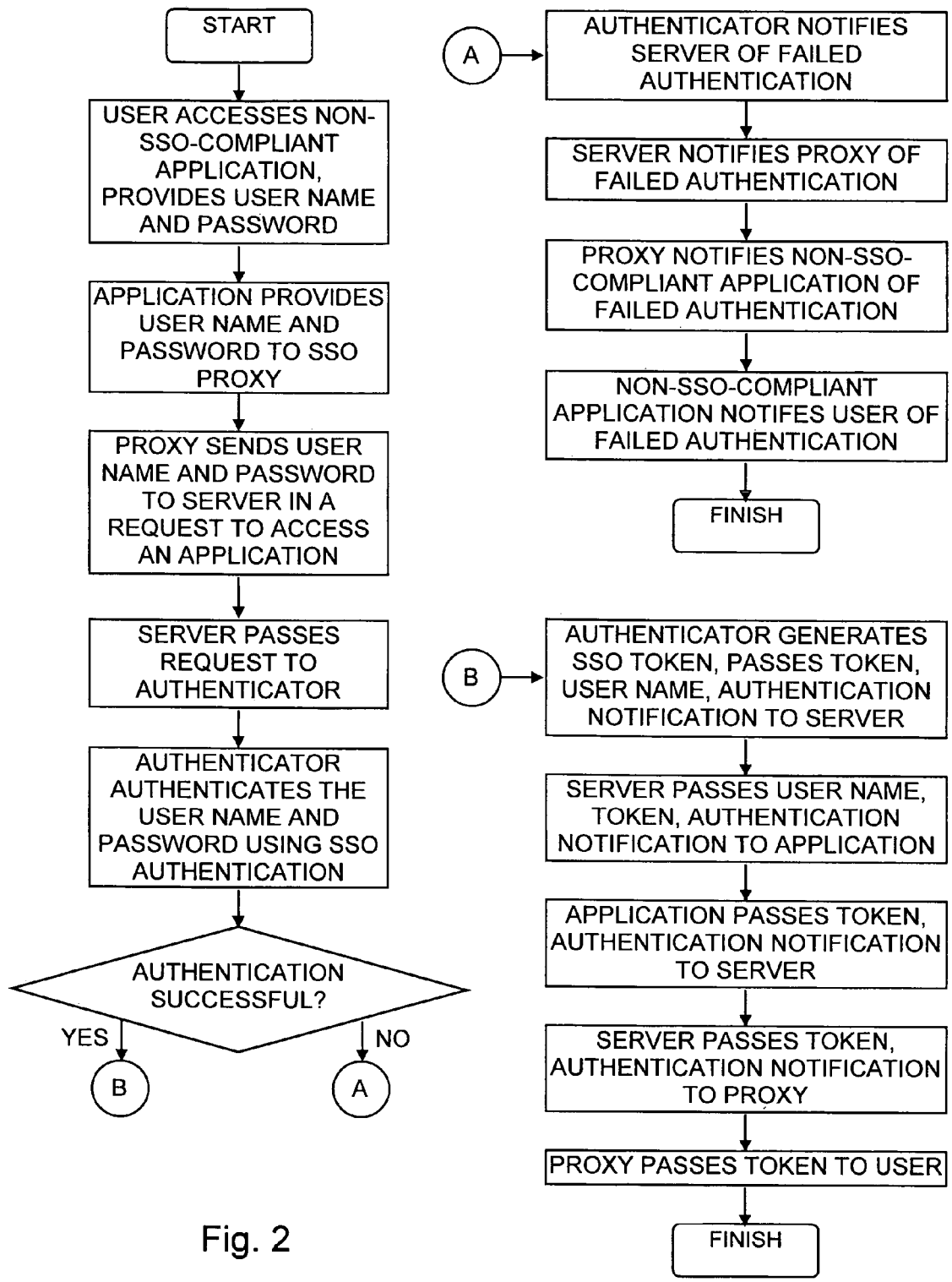
FIG. 2 is a simplified flowchart illustration of an exemplary method of operation of the system of FIG. 1, operative in accordance with a preferred embodiment of the present invention.

Reference is now made to FIG. 1, which is a simplified block-flow diagram of an SSO system supporting authentication by password for non-SSO-compliant applications, constructed and operative in accordance with a preferred embodiment of the present invention, and FIG. 2, which is a simplified flowchart illustration of an exemplary method of operation of the system of FIG. 1, operative in accordance with a preferred embodiment of the present invention. In the system of FIG. 1 and method of FIG. 2, a non-SSO-compliant application 100 is accessed by a computer user 102 who provides a user name and password to application 100. Application 100 then provides the user name and password to an SSO proxy 104, preferably being an HTTP client. Proxy 104 sends the user name and password in a request, preferably encapsulated in an HTTP request, to a server 108, preferably being a J2EE server, to access an application 106, preferably being a protected HTTP servlet. Server 108 passes the request to an authenticator 110, typically residing on server 108, which authenticates the user name and password using any SSO authentication technique. If the user name and password fails the authentication process, authenticator 110 notifies server 108 of the failed authentication. Server 108 then notifies proxy 104 of the failed authentication, whereupon the proxy 104 may likewise notify non-SSO-compliant application 100 of the failed authentication, which in turn may likewise notify user 102 of the failed authentication. If the user name and password passes the authentication process, authenticator 110 generates an SSO token and passes it to server 108 along with the user name and a notification that the user passed. Server 108 then passes the user name and token to application 106 along with the authentication notification. Application 106 then passes the token and the authentication notification to proxy 104, typically by first passing the token and the authentication notification to server 108, which then passes the token and the authentication notification to proxy 104. Proxy 104 may then pass the token on to the user.

Figure 3:
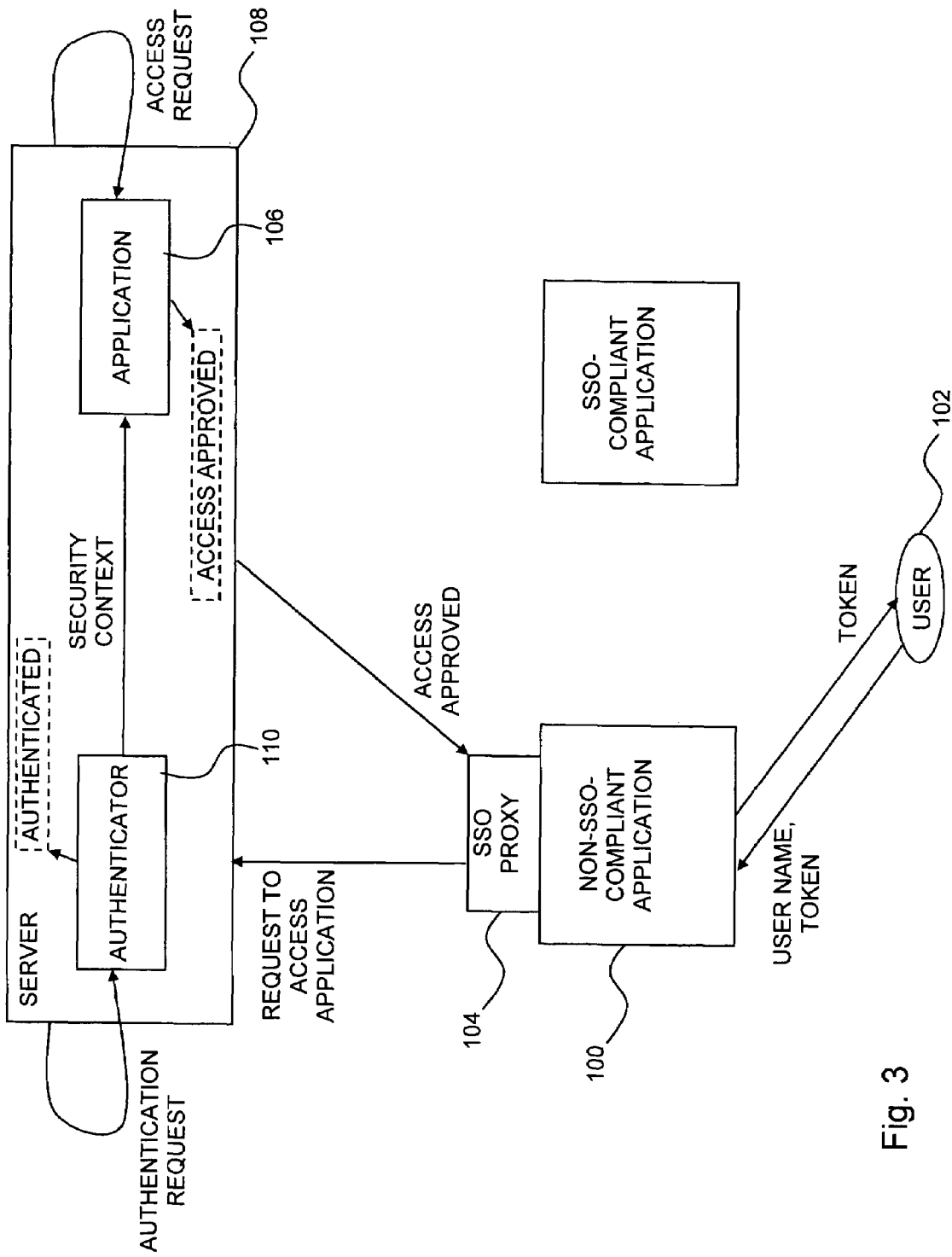
FIG. 3 is a simplified block-flow diagram of an SSO system supporting authentication by password for non-SSO-compliant applications, constructed and operative in accordance with a preferred embodiment of the present invention.
Figure 4:
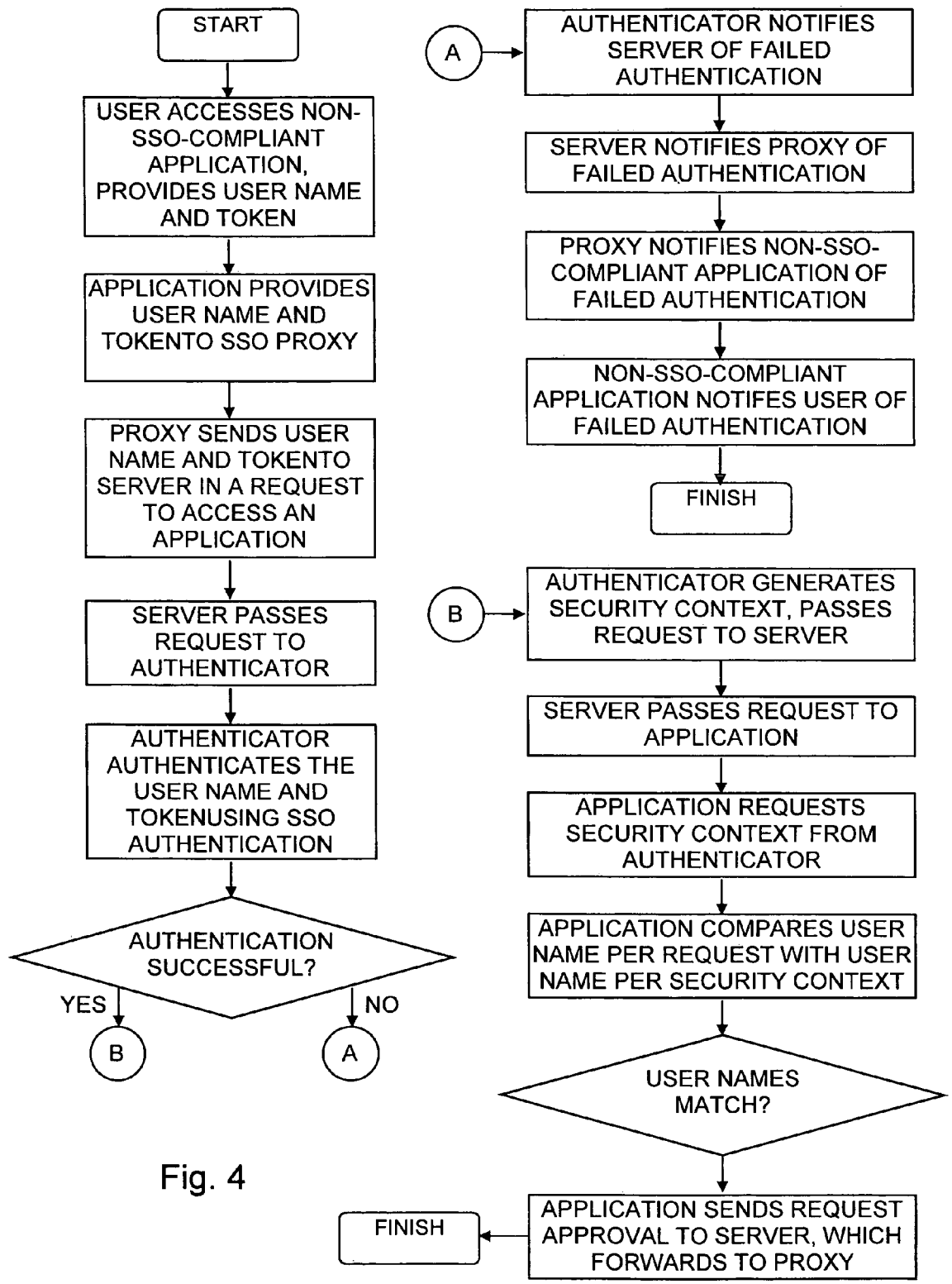
FIG. 4 is a simplified flowchart illustration of an exemplary method of operation of the system of FIG. 1, operative in accordance with a preferred embodiment of the present invention.

Reference is now made to FIG. 3, which is a simplified block-flow diagram of an SSO system supporting authentication by token for non-SSO-compliant applications, constructed and operative in accordance with a preferred embodiment of the present invention, and FIG. 4, which is a simplified flowchart illustration of an exemplary method of operation of the system of FIG. 3, operative in accordance with a preferred embodiment of the present invention. In the system of FIG. 3 and method of FIG. 4, where authenticator 110 has already authenticated user 102 and generated an SSO token for user 012, the next time user 102 wishes to access a non-SSO-compliant application, which may again be application 100 or a different application, the user provides his user name and token. Application 100 sends the user name and token to proxy 104 and requests authentication. Proxy 104 sends the user name and token in a request, preferably encapsulated in an HTTP request, to server 108 to access application 106. Server 108 passes the request to authenticator 110 which authenticates the token using any SSO authentication technique. If the token fails the authentication process, authenticator 110 notifies server 108 of the failed authentication. Server 108 then notifies proxy 104 of the failed authentication, whereupon proxy 104 may likewise notify application 100 of the failed authentication, which in turn may likewise notify user 102 of the failed authentication. If the token passes the authentication process, authenticator 110 generates a security context for the request, which preferably includes the authenticated token and associated user name, and passes the request to server 108 along with the user name and a notification that the token passed authentication. Server 108 then passes the request to application 106 along with the user name and the authentication notification. Application 106 then requests the security context of the request from authenticator 110. Application 106 then compares the user name received with the request with the user name received with the security context of the request. If the user names match, application 106 then passes to server 108 an affirmative response to the request, which server 108 then forwards to proxy 104.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques. Thus, for example, client-side components described hereinabove may be implemented using the Extensible Markup Language (XML), Hypertext Markup Language (HTML), JavaScript™, Java Applets, ActiveX™, or any combination thereof.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for providing single sign-on (SSO) authentication when accessing non-SSO-compliant applications, the method comprising:
   receiving a user name and a password at a non-SSO-compliant application;
   forwarding the user name and the password received from the non-SSO-compliant application to an SSO proxy;
   encapsulating said user name and password in a request to access a protected application;
   authenticating said user name and password responsive to said request using SSO authentication; and
   generating an SSO token if said authentication step is successful.

2. A method according to claim 1 and further comprising providing said SSO token, said user name, and a notification of said successful authentication to a server.

3. A method according to claim 1 and further comprising providing said SSO token and said user name to said protected application.

4. A method according to claim 1 and further comprising providing said token and a notification of said successful authentication to said SSO proxy.

5. A method according to claim 1 and further comprising configuring said SSO proxy as an hypertext transfer protocol (HTTP) client.

6. A method according to claim 1 and further comprising configuring said encapsulated request as an hypertext transfer protocol (HTTP) request.

7. A method according to claim 1 and further comprising sending said request to a JAVA 2 enterprise edition (J2EE) server.

8. A method according to claim 1 and further comprising configuring said protected application as a protected hypertext transfer protocol (HTTP) servlet residing on a JAVA 2 enterprise edition (J2EE) server.

9. A system for single sign-on (SSO) authentication for use with non-SSO-compliant applications, the system comprising:
   a processor; and
   a memory, the memory including:
      a non-SSO-compliant application that receives a user name and password;
      an SSO proxy operative to receive the user name and password from the non-SSO-compliant application and encapsulate said user name and password in a request to access a protected application; and
      an authenticator operative to authenticate said user name and password responsive to said request using SSO authentication and generate an SSO token if said authentication is successful.

10. A system according to claim 9 wherein said authenticator is operative to provide said SSO token, said user name, and a notification of said successful authentication to a server.

11. A system according to claim 10 wherein said server is operative to provide said SSO token and said user name to said protected application.

12. A system according to claim 10 wherein said server is a JAVA 2 enterprise edition (J2EE) server.

13. A system according to claim 9 wherein said protected application is operative to provide said token and a notification of said successful authentication to said SSO proxy.

14. A system according to claim 9 wherein said SSO proxy is an hypertext transfer protocol (HTTP) client.

15. A system according to claim 9 wherein said encapsulated request is an hypertext transfer protocol (HTTP) request.

16. A system according to claim 9 wherein said protected application is a protected hypertext transfer protocol (HTTP) servlet residing on a JAVA 2 enterprise edition (J2EE) server.

17. A method for providing single sign-on (SSO) authentication when accessing non-SSO-compliant applications, the method comprising:
   receiving a user name and a password at a non-SSO-compliant application;
   forwarding the user name and the password received from the non-SSO-compliant application to an SSO proxy;
   encapsulating said user name and token in a request to access a protected application;

authenticating said token responsive to said request using SSO authentication; and generating a security context for said request if said authentication step is successful.

18. A method according to claim 17 wherein said generating step comprises generating said security context to include said authenticated token and said user name.

19. A method according to claim 17 and further comprising passing said request, said user name, and a notification of said successful authentication to a server.

20. A method according to claim 17 and further comprising passing said request, said user name, and a notification of said successful authentication to said protected application.

21. A method according to claim 20 wherein said providing step comprises providing said affirmative response to said SSO proxy.

22. A method according to claim 17 and further comprising:

comparing said user name received with said request with said user name received with said security context of said request; and providing an affirmative response to said request if said user names match.

23. A method according to claim 17 and further comprising configuring said SSO proxy as an hypertext transfer protocol (HTTP) client.

24. A method according to claim 17 and further comprising configuring said encapsulated request as an hypertext transfer protocol (HTTP) request.

25. A method according to claim 17 and further comprising sending said request to a JAVA 2 enterprise edition (J2EE) server.

26. A method according to claim 17 and further comprising configuring said protected application as a protected hypertext transfer protocol (HTTP) servlet residing on a JAVA 2 enterprise edition (J2EE) server.

27. A system for single sign-on (SSO) authentication for use with non-SSO-compliant applications, the system comprising:

a processor; and a memory, the memory including:

a non-SSO-compliant application that receives a user name and password;

an SSO proxy operative to receive the user name and password from the non-SSO-compliant application and encapsulate said user name and token in a request to access a protected application; and an authenticator operative to authenticate said user name and token responsive to said request using SSO authentication and generate a security context for said request if said authentication step is successful.

28. A system according to claim 27 wherein said security context includes said authenticated token and said user name.

29. A system according to claim 27 wherein said authenticator is operative to pass said request, said user name, and a notification of said successful authentication to a server.

30. A system according to claim 29 wherein said server is operative to pass said request, said user name, and a notification of said successful authentication to said protected application.

31. A system according to claim 30 wherein said protected application is operative to provide said affirmative response to said SSO proxy.

32. A system according to claim 29 wherein said server is a JAVA 2 enterprise edition (J2EE) server.

33. A system according to claim 27 wherein said protected application is operative to:

compare said user name received with said request with said user name received with said security context of said request; and provide an affirmative response to said request if said user names match.

34. A system according to claim 27 wherein said SSO proxy is an hypertext transfer protocol (HTTP) client.

35. A system according to claim 27 wherein said encapsulated request is an hypertext transfer protocol (HTTP) request.

36. A system according to claim 27 wherein said protected application is a protected hypertext transfer protocol (HTTP) servlet residing on a JAVA 2 enterprise edition (J2EE) server.

37. A method for implementing single sign-on (SSO) authentication in support of non-SSO-compliant application access, the method comprising:

receiving a user name and a password at a non-SSO-compliant application;

providing a SSO proxy operative to receive the user name and the password received from non-SSO-compliant application; and configuring said SSO proxy to a) encapsulate said user name and password in a request to access a protected application, and b) send said request to a computer operative to c) authenticate said user name and password responsive to said request using SSO authentication; and d) generate an SSO token if said authentication is successful.

38. A computer program embodied on a computer-readable storage medium, the computer program comprising:

a preliminary code segment operative to receive a user name and a password at a non-SSO-compliant application;

a first code segment operative to forward the user name and the password received from the non-SSO-compliant application to an single sign-on (SSO) proxy;

a second code segment operative to encapsulate said user name and password in a request to access a protected application;

a third code segment operative to authenticate said user name and password responsive to said request using SSO authentication; and a fourth code segment operative to generate an SSO token if said authentication is successful.

* * * * *